(12) United States Patent
Johnson et al.

(10) Patent No.: US 8,646,957 B2
(45) Date of Patent: *Feb. 11, 2014

(54) VEHICLE MINI LAMP

(75) Inventors: Gary Johnson, Lakewood, NY (US);
Adam Wagner, Celeron, NY (US);
Robert C. Bartkowski, Lock Haven, PA (US); Timothy A. Dil'enti, Russel, PA (US); Kurt L. Schwab, North Warren, PA (US); Rodney Ehrlich, Monticello, IN (US)

(73) Assignee: Truck-Lite Co., LLC, Falconer, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 13/463,021

(22) Filed: May 3, 2012

(65) Prior Publication Data

US 2012/0212970 A1 Aug. 23, 2012

Related U.S. Application Data

(63) Continuation of application No. 12/645,091, filed on Dec. 22, 2009, now Pat. No. 8,192,064, which is a continuation of application No. 11/077,919, filed on Mar. 10, 2005, now Pat. No. 7,658,524.

(60) Provisional application No. 60/552,123, filed on Mar. 10, 2004.

(51) Int. Cl.
*B60Q 1/26* (2006.01)

(52) U.S. Cl.
USPC ....... 362/545; 362/477; 362/540; 362/249.02

(58) Field of Classification Search
USPC ......... 362/495, 485, 477, 510, 546, 548, 540, 362/545, 249.02, 249.03, 285
See application file for complete search history.

(56) References Cited

U.S. PATENT DOCUMENTS

| 4,290,098 | A  | * | 9/1981 | Pierson ........................ | 362/485 |
| 2002/0003708 | A1 | * | 1/2002 | Roller et al. .................. | 362/521 |
| 2004/0037087 | A1 | * | 2/2004 | Desai ........................... | 362/541 |

* cited by examiner

*Primary Examiner* — Jong-Suk (James) Lee
*Assistant Examiner* — Leah S Macchiarolo
(74) *Attorney, Agent, or Firm* — The Bilicki Law Firm, P.C.; Byron A. Bilicki; Rebecca M K Tapscott

(57) ABSTRACT

A low profile vehicle lamp assembly includes a housing having a top end, body with an interior portion and a lens portion covering the top end. The housing is adapted to fit within an opening in a surface such that the lens portion is substantially flush with the surface and the body is positioned behind the surface. In addition, circuitry is disposed within the interior portion of the housing and at least one light source is electrically connected to the circuitry.

19 Claims, 9 Drawing Sheets

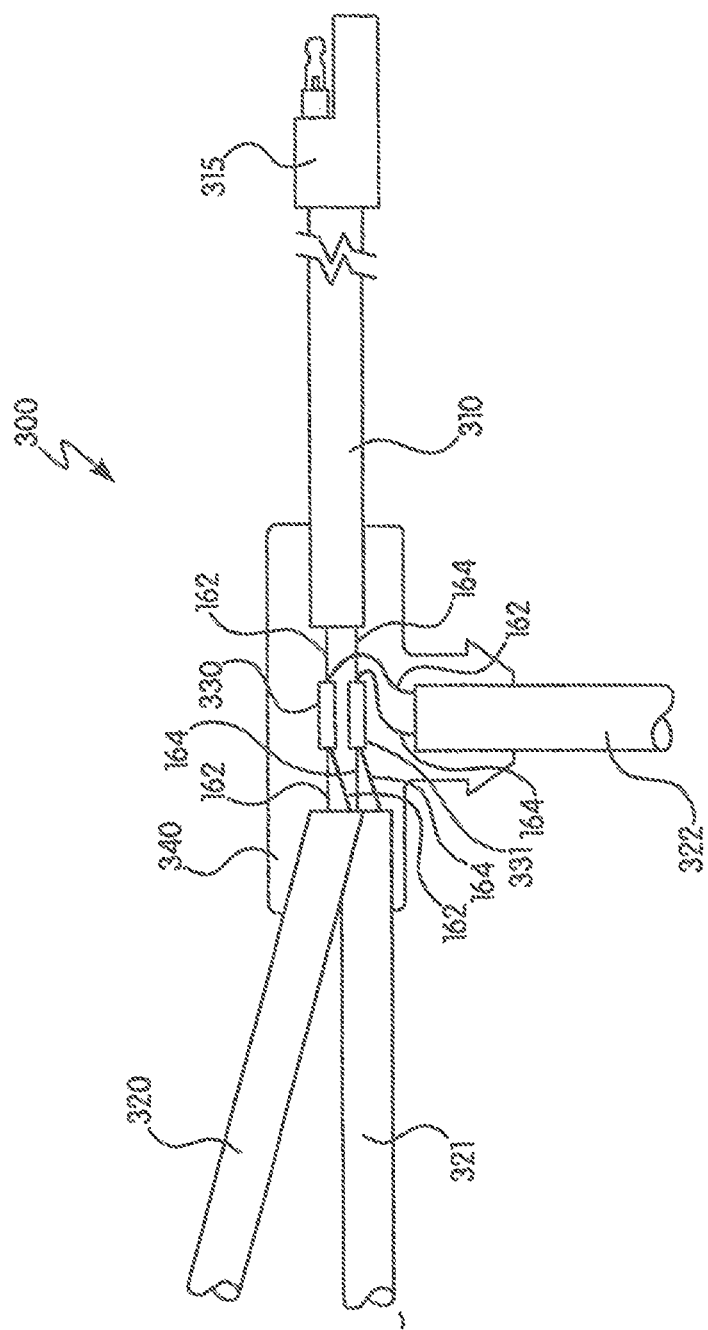

VEHICLE MINI LAMP

CROSS-REFERENCE TO RELATED APPLICATIONS

The present application is a continuation of U.S. application Ser. No. 12/645,091, filed Dec. 22, 2009, now U.S. Pat. No. 8,192,064, which is a continuation of U.S. patent application Ser. No. 11/077,919, filed Mar. 10, 2005, now U.S. Pat. No. 7,658,524, which claims priority to U.S. Provisional Application Serial No. 60/552,123 filed Mar. 10 2004.

FIELD OF THE APPLICATION

The application relates generally to vehicular lights. More particularly, a lamp and assembly for vehicles disclosed and claimed uses light emitting diodes as a light source, is small, has a low profile, and satisfies SAE and FMVSS photometric requirements.

BRIEF DESCRIPTION OF THE DRAWINGS

FIG. 9 shows one embodiment of a splitter assembly.

DETAILED DESCRIPTION OF THE EMBODIMENTS

Figure 1:
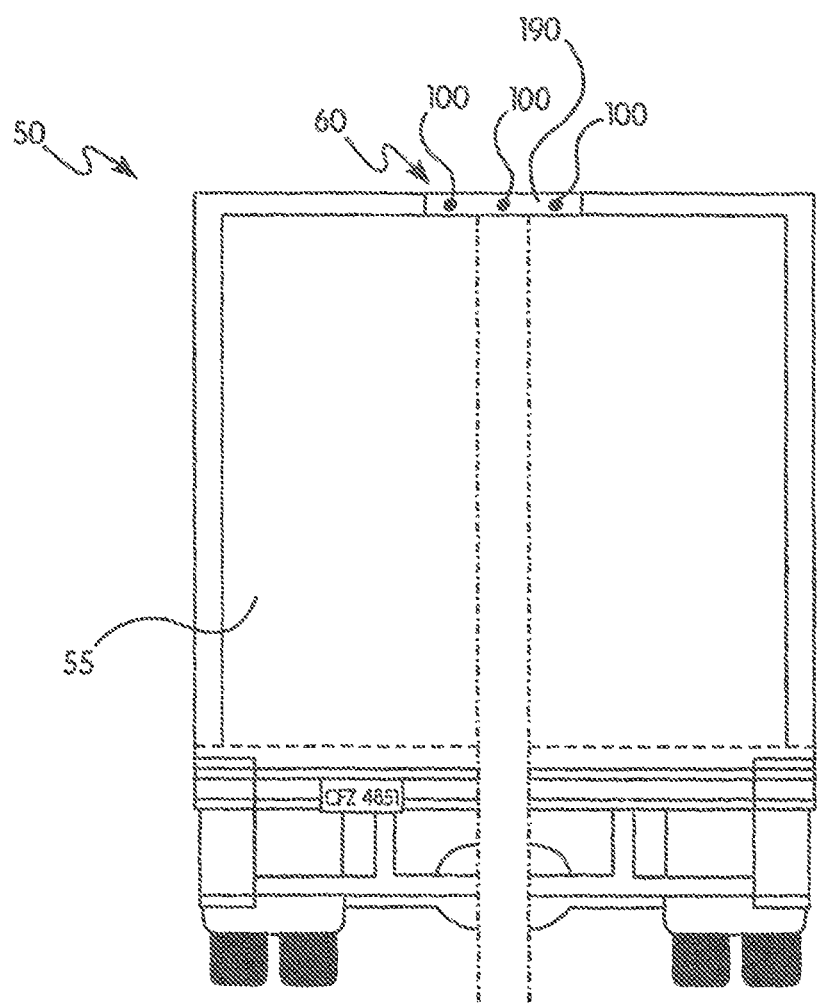
FIG. 1 is back view of a typical vehicle in which the positioning of a plurality of one embodiment of the vehicle mini lamps can be seen.

For the purpose of promoting an understanding of the vehicle mini lamp, references are made in the text hereof to embodiments of a vehicle mini lamp and assembly, only some of which are illustrated in the drawings. It is nevertheless understood that no limitations to the scope of the embodiments are thereby intended. One of ordinary skill in the art will readily appreciate that modifications such as the shape and materials of the components, the positioning of the components, the color of the LED or lens, and the number of vehicle mini lamps do not depart from the spirit and scope of the disclosed embodiments. Some of these possible modifications are mentioned in the following description. Furthermore, in the embodiments depicted, like reference numerals refer to identical structural elements in the various drawings.

The embodiments of the vehicle mini lamp that are disclosed herein are designed to satisfy the Society of Automotive Engineers (SAE) Standards. SAE Standards J592e (7/72) and J592 (8/00) specify certain photometric requirements, including luminous intensity requirements, for side marker lamps; SAE Standards J2042 (6/96), J2042 (3/00), and J2042 (3/03) specify certain photometric requirements for clearance, side marker, and identification lamps; SAE Standard J578c (2/77) specifies certain chromaticity requirements for color. All of these SAE Standards are all met by the vehicle mini lamp as disclosed herein.

The Department of Transportation (DOT), in its Federal Motor Vehicle Safety Standards, 49 C.F.R. §571.108 (2000), or "FMVSS 108," regulates all lamps, reflective devices, and associated equipment. FMVSS 108 can be found at www.nhtsadot.gov and is hereby incorporated by reference in its entirety. DOT Standard 1383 (part of FMVSS108) adopts the Society of Automotive Engineers (SAE) Standard J592 (July 1972 and August 2000), J2042 (September 1996, March 2000, and March 2003, and J578 (February 1977) for motor vehicle clearance, side marker, and identification lamps.

SAE Standard J592, paragraph 3.1 defines a "clearance lamp" as a lamp "mounted on the permanent structure of the vehicle as near as practicable to the upper left and right extreme edges that provide light to the front or rear to indicate the overall width and height of the vehicle." SAE Standard J592, paragraph 3.2 further defines a "side marker lamp" as a lamp that is "mounted on the permanent structure of the vehicle as near as practicable to the front and rear edges, that provide light to the side to indicate the overall length of the vehicle." SAE Standard J592, paragraph 3.3 defines "combination clearance and side marker lamps" as "single lamps which simultaneously fulfill performance requirements of clearance and side marker lamps." SAE Standard J592, paragraph 3.4 defines an "identification lamp" as "lamps used in groups of three, in a horizontal row, that provide light to the front or rear or both, having lamp centers that are spaced not less than 150 mm nor more than 310 mm apart, mounted on the permanent structure as near as practicable to the vertical centerline and the top of the vehicle to identify vehicles 2032 mm or more in overall width." Unless otherwise noted, the SAE definitions of these terms are adopted and used herein. The lamp of the instant application is intended to be used in any or all of these applications. The various embodiments discussed infra will satisfy all SAE standards for photometric requirements as well as chromaticity.

SAE Standard J592 also specifies certain minimum and/or maximum luminous intensity requirements for vehicular lamps functioning as clearance, side marker, and identification lamps. According to the aforementioned standards, a minimum luminous intensity must exist at various points in the illumination zone to be in compliance. These specific photometric requirements for clearance, side marker, and identification lamps, as set forth in SAE Standard J592, are included hereinbelow.

TABLE 1

PHOTOMETRIC REQUIREMENTS

| Zone | Test Points[1,2] (in degrees) | Minimum Luminous Intensity (cd), Red[3,4] | Minimum Luminous Intensity (cd), Yellow[3,4] |
|---|---|---|---|
| 1 | 45L-10U<br>45L-H<br>45L-10D | 0.75 | 1.86 |

TABLE 1-continued

PHOTOMETRIC REQUIREMENTS

| Zone | Test Points[1,2] (in degrees) | Minimum Luminous Intensity (cd), Red[3,4] | Minimum Luminous Intensity (cd), Yellow[3,4] |
|---|---|---|---|
| 2 | V-10U | 0.75 | 1.86 |
|  | V-H |  |  |
|  | V-1 0D |  |  |
| 3 | 45R-10U | 0.75 | 1.86 |
|  | 45R-H |  |  |
|  | 45R-10D |  |  |

Maximum luminous intensities of red clearance and identification lamps shall not exceed 18 Cd within the solid cone angle 45L to 45R and 10U to 10D. When red clearance lamps are optically combined with stop or turn signal lamps, the maximum applies only on or above horizontal. The maximum luminous intensity shall not be exceeded over any area larger than that generated by a 0.5 degree radius within the solid cone angle prescribed by the test points.
[2]The requirements for side markers used on vehicles less than 2032 mm wide need only be met for inboard test points at a distance of 4.6 m from the vehicle on a vertical plane that is perpendicular to the longitudinal axis of the vehicle and located midway between the front and rear side marker lamps.
[3]When calculating zone totals, the measured value at each test point shall not be less than 60% of the minimum values in Table 2.
[4]Combination clearance and side marker lamps shall conform with both clearance and side marker photometric performance requirements.

TABLE 2

PHOTOMETRIC DESIGN GUIDELINES

|  | Test Points (in degrees) | Minimum Luminous Intensity (cd), Red[1,2] | Minimum Luminous Intensity (cd), Yellow[2] |
|---|---|---|---|
| 10U | 45L | 0.25 | 0.62 |
|  | V | 0.25 | 0.62 |
|  | 45R | 0.25 | 0.62 |
| H | 45L | 0.25 | 0.62 |
|  | V | 0.25 | 0.62 |
|  | 45R | 0.25 | 0.62 |
| 10D | 45L | 0.25 | 0.62 |
|  | V | 0.25 | 0.62 |
|  | 45R | 0.25 | 0.62 |

[1]The maximum design value of a lamp intended for the rear of the vehicle should not exceed the listed design maximum over any area larger than that generated by 0.25 degree radius within the solid angle defined by the test points in Table 2.
[2]For combined clearance and side marker lamps, both the clearance and side marker photometric design values should apply.

SAE Standard J592, paragraph 6.1.7 also requires that the color of the emanating light produced by a front clearance lamp, front and intermediate side marker lamps, and front identification lamp be yellow, and that rear clearance lamps, side marker lamps, and identification lamps shall be red, both as specified in SAE Standard J578. SAE J578, entitled "Color Specification," sets forth the fundamental requirements for color, expressed as chromaticity coordinates according to the CIE (1931) standard colorimetric system. Pursuant to SAE J578, paragraphs 3.1.1 and 3.1.2, respectively, the following requirements for red and yellow amber light shall apply when measured by the tristimulus or spectrophotometric methods, as are well-known in the art.

TABLE 3

RED LIGHT

The color of light emitted from the device shall fall within the following boundaries:
y = 0.33 (yellow boundary)
y = 0.98 − x (purple boundary)

TABLE 4

YELLOW AMBER LIGHT

The color of light emitted from the device shall fall within the following boundaries:
y = 0.39 (red boundary)
y = 0.79 − 0.67x (white boundary)
y = x − 0.12 (green boundary)

SAE J592 standard and SAE J578 standard can also be found at www.sae.com and are hereby incorporated by reference in their entireties, as is FMVSS 108, 49 C.F.R. §571.108 (2000)

In addition, it is intended that the lamps disclosed herein could also be used on mirrors, cabs, cars, and other non-trailer applications. Moreover, the lamps can be used on other types of vehicles, including but limited to watercraft, motorcycles, and the like, whether or not specific SAE or FMVSS photometric standards apply.

FIG. 1 is back view of a typical vehicle 50 in which the positioning of a plurality of one embodiment of vehicle mini lamp 100, being used as identification lamp assembly 60, can be seen. In the embodiment shown, there are three vehicle mini lamps 100 generally centered and along the top of back end 55 of vehicle 50. However, this is not intended to be limiting, as provided and described in detail infra.

Figure 2:
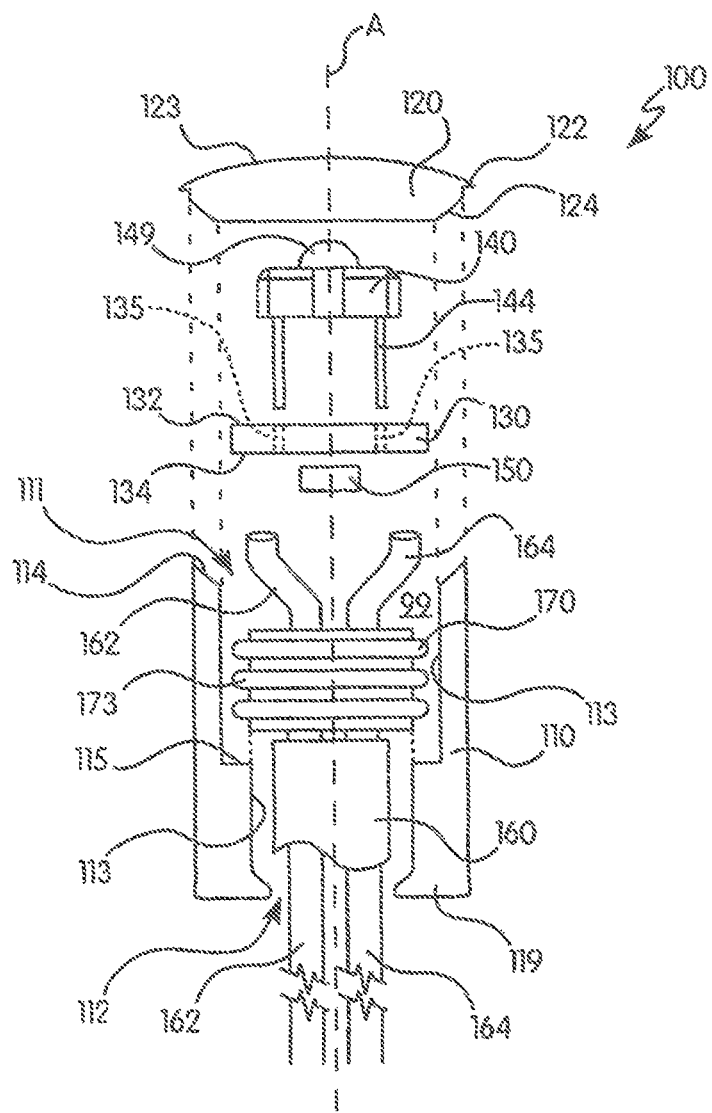
FIG. 2 is an exploded view of the vehicle mini lamp according to one embodiment.

FIG. 2 shows an exploded view of one embodiment of one vehicle mini lamp 100, which, in the embodiment shown, is comprised of housing 110, lens 120, and circuit board 130, all generally cylindrical about axis A, as well as LED 140, resistor 150, cable 160, cable wires 162, 164, and cable seal 170. One of ordinary skill in the art will recognize, however, that multiple LEDs can be used instead of the single LED 140 shown.

In the embodiment shown in FIG. 2, housing 110 is generally cylindrical about axis A, with two openings, top opening 111 and bottom opening 112. Bottom opening 112 allows cable 160 and cable wires 162, 164 to enter housing 110, and top opening 111 allows the components to be assembled outside of housing 110 before being sealed within housing 110, as discussed in greater detail infra. In the embodiment shown, ledge 115 is also visible. Housing 110 is comprised of ledge 115 so that circuit board 130 rests atop it when assembled, properly positioning the various elements within housing 110.

In an alternate embodiment, inner surface 113 of housing 110 is tapered such that top opening 111 is of a greater diameter than bottom opening 112. The tapering of inner surface 113 of housing 110 allows for a snug fit between circuit board 130 and housing 110 as circuit board 130 is positioned within housing 110, creating a junction between the two components.

Also visible on housing 110 is top surface 114. Top surface 114, in one embodiment, is angled to receive corresponding bottom surface 124 of lens 120. Lens 120 is then attached to housing 110 by use of a glue, adhesive, or epoxy between bottom surface of lens 120 and top surface 114 of housing 110, forming cavity 99 within housing 110. In an alternate embodiment, top surface 114 of housing 110 and bottom surface 124 of lens 120 are horizontally flat and secured to one another. In yet another embodiment, the shape of top surface 114 of housing is configured such that lens 120 snaps into housing 110, securing lens 120 to housing 110. Lens 120 and housing 110 can also be connected to one other via high frequency welding, hot gas welding, ultrasonic welding, hot plate welding, or vibration welding. Lens 120 could also be attached to housing 110 via a fastener such as a snap-ring, a screw, or a rivet, or both could be threaded such that lens 120 threadedly engages housing 110. Glue or an 0-ring can further be used at the junction between housing 110 and lens 120 to further produce a liquid and air-tight junction.

In the embodiment shown in FIG. 2, lens 120 is made of polycarbonate plastic, but could also be made of acrylic, glass, or any other material that is sufficiently durable and satisfies the requirements set forth in SAE J576 (7/91), "Plastic Materials for Use in Optical Parts Such as Lenses and Reflectors of Motor Vehicle Lighting Devices." Housing 110 is also made of polycarbonate plastic in the embodiment shown in FIG. 2, but could also be made of acrylic or any other durable material that is compatible with the material chosen for lens 120. The adhesive chosen to adhere lens 120 to housing 110 must be compatible with the materials chosen for lens 120 and housing 110. For example, the embodiment shown in FIG. 2 uses a polycarbonate housing and a polycarbonate lens 120.

As stated supra, lens 120 is adapted to meet with housing 110, forming cavity 99, within which the other components of vehicle mini lamp 100 are situated. As can be seen in FIG. 2, in one embodiment, lens 120 has a generally arcuate top surface 123. Top surface 123 need not be arcuate, but the shape shown in FIG. 2 aids in maintaining a low profile of vehicle mini lamp 100 when mounted to a mounting structure (not shown). In the embodiment shown, lens 120 is further comprised of lip 122 so that when lens 120 is secured to housing 110, lip 122 is generally flush with an attachment member (not shown, but discussed infra) or the mounting structure. In an alternate embodiment, lens 120 does not include lip 122, but is still generally flush with the attachment member or surface of the mounting structure. In the embodiment in which top surface 123 of lens 120 is not arcuate, but flat, top surface 123 of housing 120 is still generally flush with the attachment member.

Also visible in FIG. 2 is circuit board 130, which, when the embodiment shown of vehicle mini lamp 100 is assembled, is positioned atop ledge 115. One embodiment of circuit board 130 is made of an epoxy fiberglass material, with copper clad on both top surface 132 and bottom surface 134. The copper clad is etched away, leaving copper traces behind which act as the electrical circuitry between the various electrical components mounted to circuit board 130, i.e., LED 140, resistor 150, and cable wires 162 and 164, as well as any other electrical components that may be added, such as circuit protection. In an alternate embodiment, circuit board 130 is a metalcord board comprised of a base metal layer, a dielectric layer, and a copper layer. Also visible in FIG. 2 are a plurality of throughholes 135, which penetrate the thickness of circuit board 130. Throughholes 135 are plated with an electrically conductive material, allowing electrical continuity between the traces on top surface 132 and bottom surface 134 of circuit board 130.

The electrical components mounted to circuit board 130 can be mounted in conventional ways, known to those of ordinary skill in the art, including, but not limited to, soldering, clinching, or using an adhesive. In the embodiment shown in FIG. 2, there are three components mounted to circuit board 130: LED 140, resistor 150, and cable wires 162, 164. LED leads 144 of LED 140 penetrate the length of throughholes 135 and are soldered to bottom surface 134 of circuit board 130. Similarly, cable wires 162, 164 penetrate throughholes 135 of circuit board 130 and are soldered to top surface 132 of circuit board 130. Also mounted to circuit board 130 is resistor 150, which is mounted to bottom surface 134 of circuit board 130. In the embodiment shown, resistor 150 is a surface-mounted resistor. Cable wires 162, 164, can alternately be mounted directly onto bottom surface 134 of circuit board 130, LED 140 can be mounted directly onto top surface 132 of circuit board 130, and/or resistor 150 can be mounted to top surface 132 of circuit board 130 and situated between LED 140 and circuit board 130. However, throughholes 135 or another way of providing electrical continuity between top surface 132 and bottom surface 134 of circuit board 130 known to those of ordinary skill in the art would still be necessary in any embodiment in which all of the components are not mounted to the same side of circuit board 130. For example, in an embodiment in which LED 140 is mounted to top surface 132 of circuit board 130 and resistor 150 and cable wires 162, 164 are mounted to bottom surface 134 of circuit board 130, throughholes 135 are plugged with solder which still allows for electrical continuity between all of the electrical components. In another alternate embodiment, cable wires 162, 164 penetrate throughholes 135 and are mounted to top surface 132 of circuit board 130, and LED 140 and resistor 150 are also mounted to top surface 132 of circuit board 130, making electrical continuity between top and bottom surfaces 132, 134 or circuit board 130 unnecessary.

LED 140, comprised of LED leads 144 and dome 149, can also be seen in FIG. 2. LED 140 in the embodiment shown is a "Superflux" LED, well known to those of ordinary skill in the art, but could be another commercially available LED. Although not visible from this perspective, there are four (4) LED leads 144, which, because LED 140 is generally square, provides for a stable mount. Leads 144 are soldered to circuit board 130, but could be clinched or attached using an adhesive. In an alternate embodiment of vehicle mini lamp 100, a surface mounted LED is employed, which does not have the leads, but produces vehicle mini lamp 100 with a slightly shorter profile. However, use of the Superflux LED, with leads 144 creates a gap between LED 140 and circuit board 130, which helps facilitate heat dissipation and permits the potting compound (discussed infra) to fit between LED 140 and circuit board 130 for a more secure attachment.

Also visible in the embodiment of vehicle mini lamp 100 shown in FIG. 2 is resistor 150 to control current to LED 140 and is mounted to bottom surface 134 of circuit board 130. In operation, resistor 150 generates heat. Resistor 150 is therefore mounted to bottom surface 134 of circuit board 130 to facilitate heat dissipation. However, as included supra, resistor 150 could also be mounted to top surface 132 of circuit board 130, between circuit board 130 and LED 140. In the embodiment shown in FIG. 2, resistor 150 is a 0.5 Watt surface mount, readily available. However, one of ordinary skill in the art will recognize that other resistors could be used, as long as they have a similarly small profile. The exact resistor will depend on the power supply and the LED bin that is used.

Figure 3A:
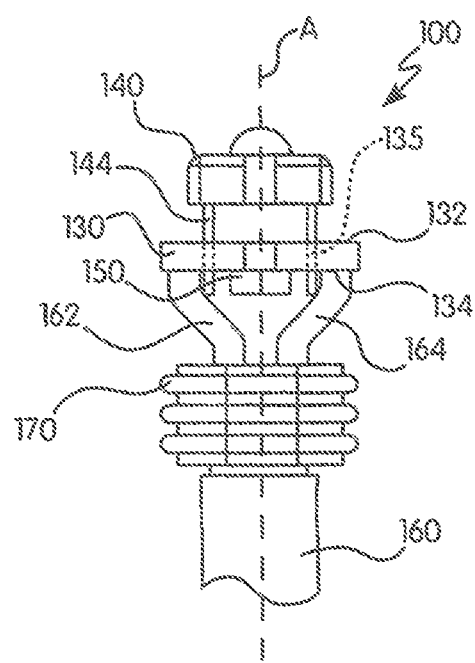
FIGS. 3A and 3B show cross-sectional views of one embodiment of the electrical components of the vehicle mini lamp.
Figure 3B:
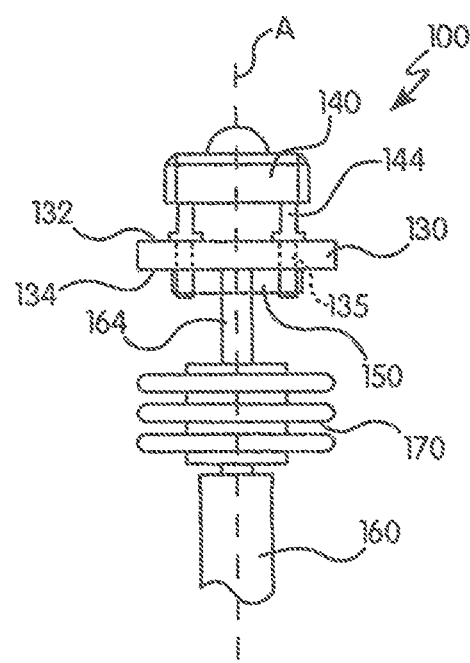

FIGS. 3A and 3B show cross-sectional, side perspective views of the embodiment of the electrical components of vehicle mini lamp 100 as shown in FIG. 2, in which the electrical components have been assembled. FIG. 3A is from one side and FIG. 3B is from a perspective in which vehicle mini lamp 100 has been turned ninety degrees (90°) about axis A. As can be appreciated, LED leads 144 penetrate through circuit board 130 via throughholes 135 and are soldered to bottom surface 134 of circuit board 130, and resistor 150 is mounted to bottom surface 134 of circuit board 130.

Referring again to FIG. 2, cable 160, cable wires 162, 164, and cable seal 170 can all be appreciated. In the embodiment shown, cable 160 is a two-conductor cable, comprised of cable wires 162, 164, which is inserted through bottom opening 112 of housing 110 and cable seal 170. Cable wires 162, 164 are then electrically connected to circuit board 130, as discussed supra. When assembled, cable seal 170 is situated within the narrow portion of the bore within housing 110. The embodiment of cable seal 170 shown in FIG. 2 is comprised of three (3) flanges 173, which aid in creating an air and water-tight seal with housing 110, and define the bottom surface of cavity 99 within housing 110. In the embodiment shown, cable seal 170 is made of silicone, but can alternately be made of PVC, Teflon, or any comparable material. End portion 119 of housing 110, in the embodiment shown in FIG. 2, is thicker than the remainder of housing, making bottom opening 112 of housing 110 of a lesser diameter than the rest of the housing bore to prevent cable seal 170 from disengaging housing 110.

Figure 4:
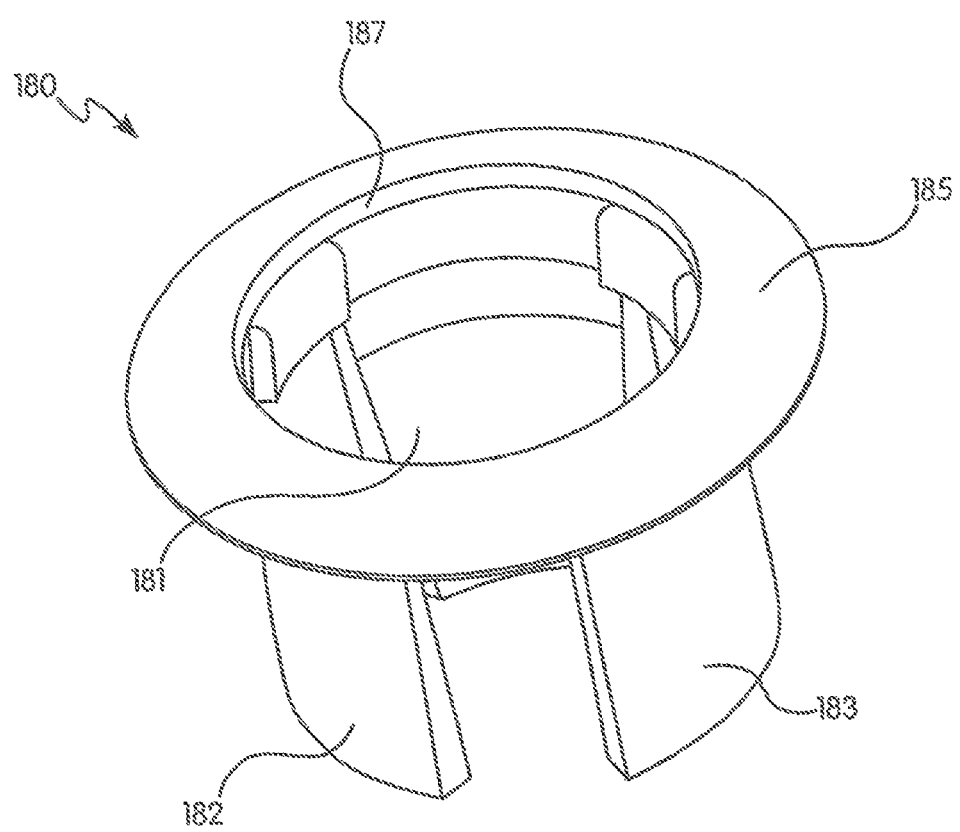
FIG. 4 shows a top perspective view of one embodiment of an attachment member.

FIG. 4 shows a top perspective view of one embodiment of attachment member 180. As used herein, the term "attachment member" refers to any element used to secure, permanently or non-permanently, vehicle mini lamp 100 to mounting structure 190, including but not limited to a grommet, or any other rigid or flexible material. As can be seen, in the embodiment shown, attachment member 180 has three legs 181, 182, and 183, and is flush with and fixedly secures the vehicle mini lamp (not shown) within the mounting structure (not shown). The use of three legs 181, 182, and 183 is exemplary only and not intended to be limiting. That is, any number of legs can be used that secure attachment member 180 and the vehicle mini lamp to mounting structure 190. In the embodiment shown, upper surface 185 of attachment member 180 is further comprised of recess 187 adapted to receive, in part, the lens (also not shown) and top surface 185 is generally arcuate as will be discussed infra. Attachment member 180 is made of nylon or another material with similar flexibility. Attachment member 180 secures vehicle mini lamp 100 to mounting structure 190 to prevent vehicle mini lamp 100 from being removed once installed, i.e., theft-resistant. Attachment member 180 is, in the embodiment shown, made of nylon, but could also be made of polycarbonate, another thermoplastic, or another material of similar properties and characteristics. Although not depicted in FIG. 4, vehicle mini lamp could further include a gasket between attachment member 180 and mounting structure 190 to provide a water-tight seal.

In alternate embodiments of vehicle mini lamp 100, vehicle mini lamp 100 is secured to mounting structure 190 by glue, a fastener, or a snap. In an embodiment in which attachment member 180 is a grommet, the grommet functions the same as attachment member 180 in that it provides a structure for mounting vehicle mini lamp 100 to mounting structure 190, but does so in a more temporary way so that vehicle mini lamp 100 can be easily removed and replaced. The grommet is typically made of PVC plastic, but can alternately be made of any material with comparable properties.

Figure 5:
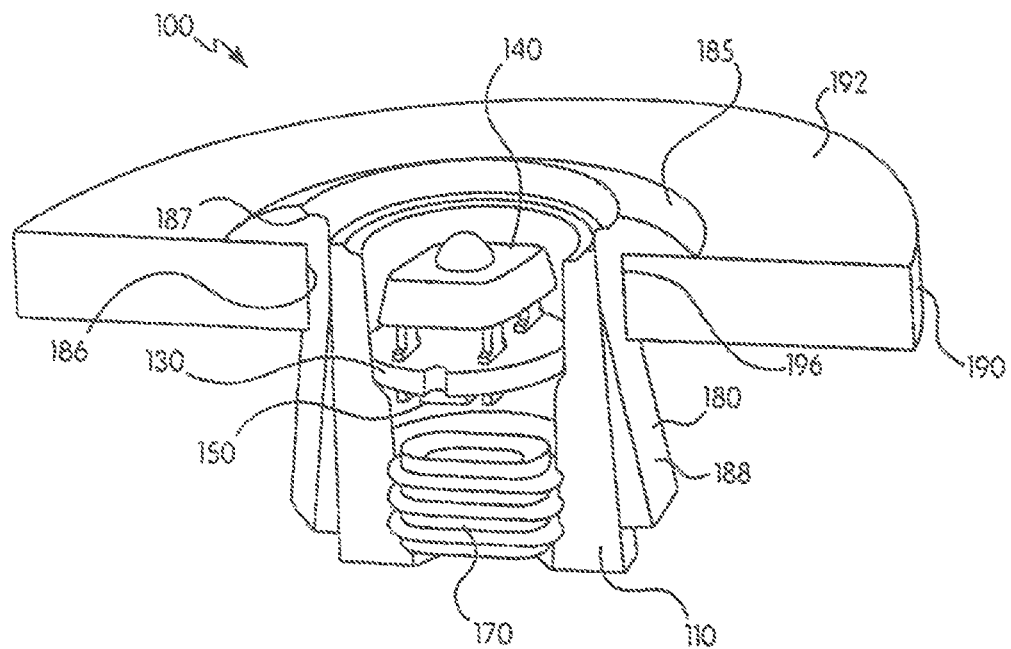
FIG. 5 shows a top perspective view of the vehicle mini lamp with some of the electrical components assembled within the housing according to one embodiment.

FIG. 5 shows a top perspective view of vehicle mini lamp 100, in which the electrical components are assembled within housing 110 and further including attachment member 180. As can be appreciated, recess 187 in upper surface 185 of attachment member allows lens 120 to be flush with attachment member 180 when vehicle mini lamp 100 is set within aperture 196 of mounting structure 190. FIG. 5 also shows housing 110, lens 120, circuit board 130, LED 140, resistor 150, cable seal 170, and attachment member 180. Furthermore, in the embodiment shown in FIG. 5, upper surface 185 of attachment member 180 is wider than aperture 196 of mounting structure 190 and slightly arcuate so that vehicle mini lamp 100 is generally flush with surface 192 of mounting structure 190 (discussed in greater detail infra) into which it is set, creating a low profile. Also visible in the embodiment of attachment member 180 shown in FIG. 5 is side recess 186. Side recess 186 is of a length that is the same as mounting structure 190 is thick. Also visible is attachment member base 188. Attachment member base 188 is of a thickness that is slightly wider than aperture 196 of mounting structure 190, so that when vehicle mini lamp 100 is positioned within aperture 196 of mounting structure 190, the combination of attachment member side recess 186, attachment member base 188, and upper surface 185 secures vehicle mini lamp 100 within aperture 196 of mounting structure 190.

Figure 6:
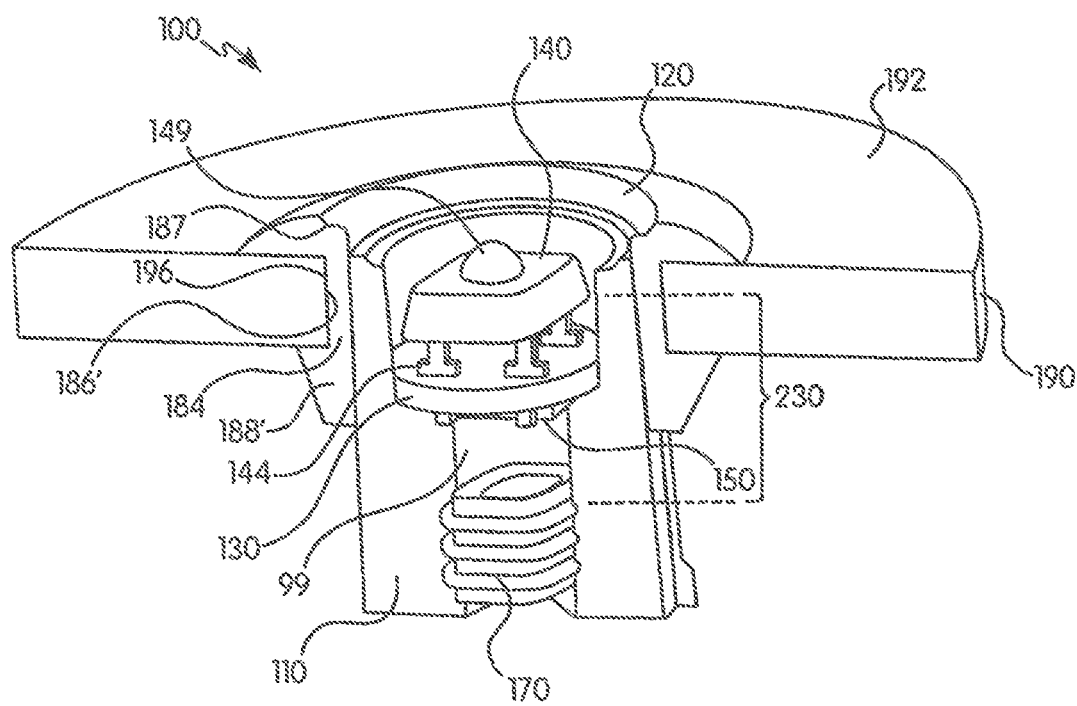
FIG. 6 shows a top perspective view of the vehicle mini lamp with some of the electrical components assembled within the housing and an alternate embodiment of the attachment member according to an alternate embodiment of the vehicle mini lamp.

FIG. 6 shows a top perspective view of an alternate embodiment of vehicle mini lamp 100 in which, like FIG. 5, housing 110, lens 120, circuit board 130, LED 140, resistor 150, cable seal 170, and rail can all be seen. However, FIG. 6 shows an alternate embodiment of vehicle mini lamp 100 in which attachment member is grommet 184. Grommet 184 also uses recess 186' to secure vehicle mini lamp 100 within aperture 196 of mounting structure 190, and grommet base 188' is shaped differently from that of attachment member base 188 as shown in FIG. 5, but still prevents moisture from entering vehicle mini lamp 100.

Also shown in FIG. 6 is the volume in which potting compound 230 is disposed within cavity 99 of housing 110. In one embodiment, potting compound 230 completely encases resistor 150, circuit board 130, that part of the cable wires (not shown), that are within cavity 99 and part of LED 140, fully encapsulating all of the electrical components (except part of LED 140) and all of the electrically active areas. Potting compound 230 is also in the area between circuit board 130 and cable seal 170. However, potting compound 230 only partially encapsulates LED 140, such that LED leads 144 are encapsulated, but dome 149 is not covered by potting compound 230 as this could affect the amount of light emitted from vehicle mini lamp 100. In an alternate embodiment, potting compound 230 does not encase the electrical components, but only the electrical connections between the electrical components. Two examples of potting compound 230 are Resin ER 1005 LV, manufactured by Star Technology, InC.™ and a two-part potting compound which combines Resin E-285-1A with Hardener E-285-1B, which cures when exposed to UV light, also manufactured by Star Technology, Inc.™.

Potting compound 230 provides a heat sink to vehicle mini lamp 100 and withdraws thermal energy directly away from LED 140. Potting compound 230 further provides protection for the electrical components, i.e., LED 140, circuit board 130, resistor 150, and the wires from vibration, fatigue, and moisture.

For the purpose of describing the method of assembling vehicle mini lamp 100, FIG. 2 will again be referred to. One of ordinary skill in the art will realize, however, that unless otherwise noted, the steps need not be followed in any specific order and that additional steps may be added. The addition of further steps as well as performing the steps in the formation of vehicle mini lamp 100 in alternate orders are intended to be within the spirit and scope of the disclosed embodiments.

The first step in the formation of vehicle mini lamp 100 is to attach the electrical components to the circuit board. Leads 144 of LED 140 are soldered or otherwise electrically connected to circuit board 130, whether to top surface 132 or first passed through throughholes 135 and then soldered to bottom surface 134 of circuit board 130. Resistor 150 is also soldered to circuit board 130. In an embodiment in which resistor 150 is electrically connected to bottom surface 134 of circuit board 130, resistor 150 can be electrically connected to circuit board 130 either before or after LED 140 is electrically affixed to circuit board 130. However, in an embodiment in which resistor 150 is electrically affixed to top surface 132 of circuit board 130, resistor 150 should be affixed before LED 140 is affixed for ease of assembly. Cable wires 162, 164, further comprised of cable seal 170 and cable 160 (as in the embodiment shown in FIG. 2) are also soldered or otherwise electrically connected to circuit board 130, whether directly to bottom surface 134 or to top surface 132 after first passing through throughholes 135.

The electrical components, i.e. circuit board 130, LED 140, resistor 150, and cable wires 162, 164, are then positioned within housing 110. In the embodiment shown, circuit board 130 is positioned to rest on ledge 115 of housing 110. In an embodiment in which housing has a tapered inner surface 113, circuit board 130 is positioned within housing 110 such that it is snugly disposed therein. Cable seal 170 is also positioned within housing 110, but within a lower portion of housing 110 such that it is substantially disposed substantially adjacent to bottom opening 112 of housing. Cable seal 170, along with housing 110 form cavity 99.

Potting compound 230 (not shown in FIG. 2) is then injected into cavity 99 and allowed to cure. As discussed supra, only enough potting compound 230 is disposed within cavity 99 to encase the electrical components and form a seal with cable seal 170, but not fully encapsulate LED 140 or the area between LED 140 and lens 120. When allowed to cure, potting compound 230 encapsulates circuit board 130, resistor 150, that portion of cable wire 162, 164 between cable seal 170 and circuit board 130, all electrical connections, and part of LED 140, including leads 144, but not dome 149, so as not to affect the light emitted from LED 140.

Lens 120 is affixed to housing 110 via means provided supra. In an embodiment of vehicle mini lamp 100 in which top surface 185 of attachment member 180 further has recess 187 disposed thereon, attachment member 180 is placed over and around housing 110 before affixing lens 120 to housing 110 or to housing 110 and attachment member 180.

Figure 7:
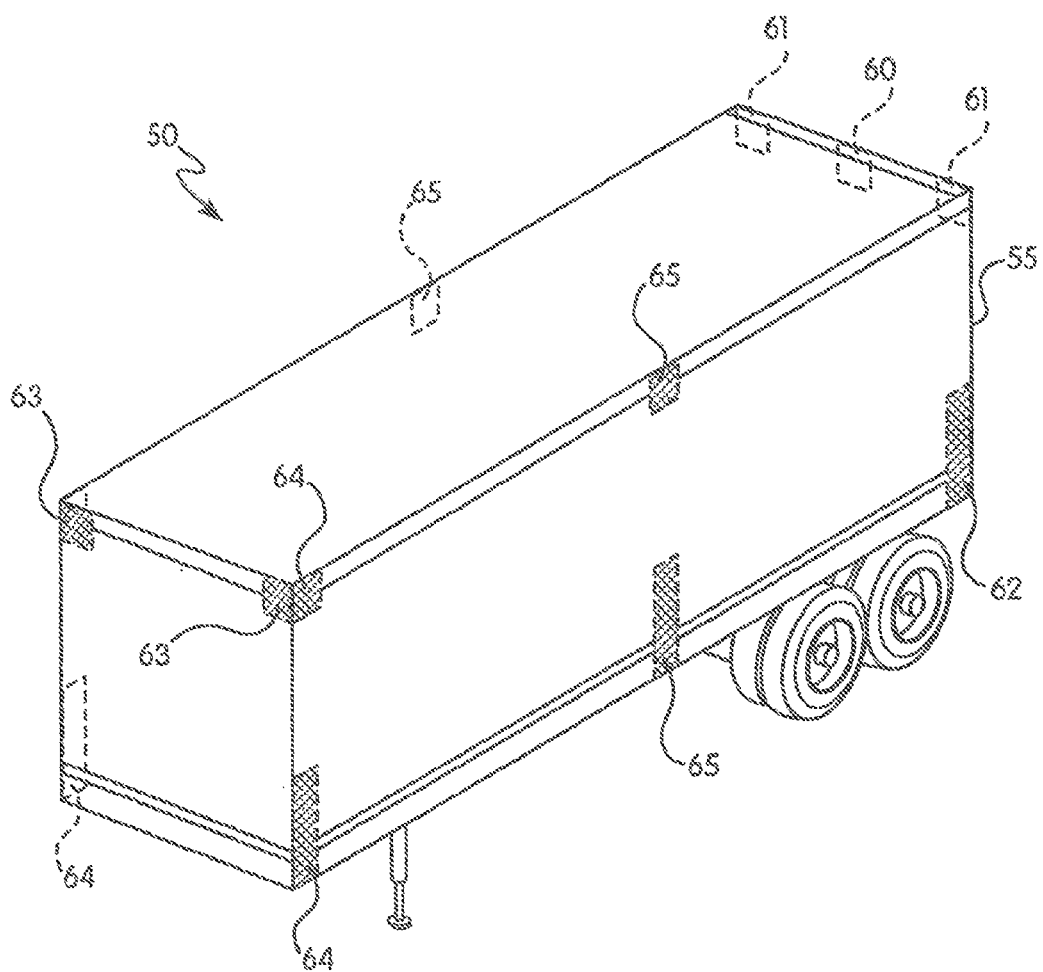
FIG. 7 shows some of the various possible positions on a vehicle where the vehicle mini lamp can be positioned.

Vehicle mini lamp 100 is intended to be used alone, in combination with other vehicle mini lamps 100, or in combination with other lamps of other sorts. In addition, vehicle mini lamp 100 can emit red light, yellow-amber light, or any other color light, depending on the position on vehicle 50. In order to achieve a desired color (i.e., red, yellow-amber, white, or other), lens 120 can be colored, LED 140 can be colored, or a combination of the two. FIG. 7 shows some of the various possible positions on vehicle 50 where vehicle mini lamp 100 could be positioned: as rear identification lamp 60 (as shown in FIG. 1), as rear clearance lamps 61, as rear side marker lamps 62, as front clearance lamps 63, as front side marker lamps 64, and as intermediate side marker lamps 65. As is required by the SAE standards and federal law as provided supra, identification lamps 60, rear clearance lamps 61, and rear side marker lamps 62 must be red, and front clearance lamps 63, front side marker lamps 64, and intermediate side marker lamps 65 must be yellow amber.

A single vehicle mini lamp 100 can be positioned at any particular location on vehicle 50 as shown in FIG. 7 or other locations, or a set of vehicle mini lamps 100 can be used to satisfy the lighting requirements. For example, identification lamps 60 of FIG. 1 are three (3) vehicle mini lamps mounted on mounting structure 190, equally spaced apart from one another and adapted to be affixed to vehicle 50 at the position shown in FIGS. 1 and 7.

Figure 8A:
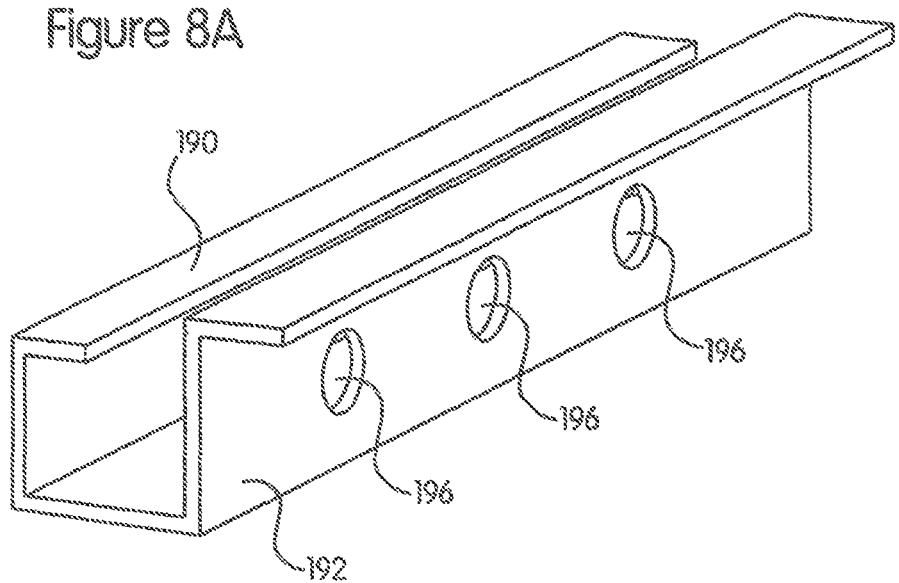
FIG. 8A shows a top perspective view of one embodiment of a mounting structure on which the vehicle mini lamp is mounted in a vehicle mini lamp system.

FIG. 8A shows a top perspective view of one embodiment of mounting structure 190, on which vehicle mini lamp 100 is mounted in a vehicle mini lamp system. Mounting structure 190 is comprised of three (3) apertures 196, each adapted to receive one vehicle mini lamp 100. One alternate embodiment of mounting structure 190 has five (5) apertures 196 and corresponding vehicle mini lamps 100, equally spaced apart, as is required for identification lamp 60 in Canada. Still another embodiment of mounting structure 190 also has five (5) apertures 196 and corresponding vehicle mini lamps 100, but instead of having five (5) apertures 196 and five (5) corresponding vehicle mini lamps 100 functioning as identification lamp 60, mounting structure 190 is the entire width of vehicle 50, with three (3) apertures 196 and corresponding vehicle mini lamps 100 functioning as identification lamp 60 and the two (2) outermost apertures 196 and corresponding vehicle mini lamps 100 functioning as rear clearance lamps 61. Mounting structure 190 can be made of any material which provides adequate durability and corrosion-resistance and is structurally sound. For example, mounting structure 190 can be made of metal (e.g., aluminum or A36 steel), plastic, wood, or fiberglass.

Figure 8B:
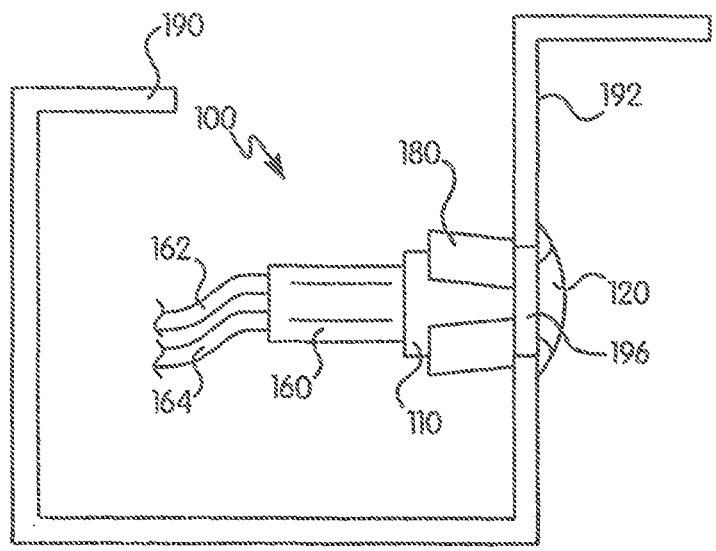
FIG. 8B shows a side cross-sectional view of one embodiment of a mounting structure with one vehicle mini lamp affixed thereto.

FIG. 8B shows a side cross-sectional view of one embodiment of mounting structure 190 with one (1) vehicle mini lamp 100 affixed thereto according to one embodiment. Lens 120, attachment member 180, housing 110, cable 160, and cable wires 162, 164 of vehicle mini lamp 100 can all be appreciated, as well as aperture 196 of mounting structure 190. As can be seen, recess 186 in attachment member 180 corresponds with the thickness of mounting structure 190 so that there is a tight sealed junction between vehicle mini lamp 100 and mounting structure 190.

For the other lamps on vehicle 50, other types of mounting structures 190 may be required. For example, an adapter plate or mounting bracket designed for a flat or slightly curved surface may be necessary.

In one embodiment of the vehicle mini lamp system, each vehicle mini lamp 100 is individually connected to a power source. In an alternate embodiment, a splitter assembly is used so that all vehicle mini lamps 100 within the same system are electrically connected in parallel. FIG. 9 shows one embodiment of splitter assembly 300. As can be seen, this embodiment of splitter assembly 300 is comprised of connector wire 310, two (2) splices 330 and 331, three (3) cables 320, 321, and 322, and splitter housing 340. Each cable 320, 321, and 322 is comprised of cable wire 162, 164 (as shown and described in detail supra) and connector wire 310 is further comprised of two-position connector 315 which connects splitter assembly 300 to a power source (not shown). Within splitter housing 340, splice 330 directs current from cable wire 162 of connector wire 310 to cable wires 162 of cables 320, 321, and 322, and splice 331 directs current from cable wire 164 of connector wire 310 to cable wires 164 of cables 320, 321, and 322. Splitter housing 340 is made of PVC, but can be made of any material capable of providing similar sealing qualities.

Splitter housing 340 is water and air-tight so that the electrical connections between cable wires 162, 164, splices 330, 331, cables 320, 321, and 322, and connector cable 310 is prevented from corroding. Each cable 320, 321, and 322 is then connected to one corresponding vehicle mini lamp (not shown) and encases cable wires 162, 164 their entire length between splitter housing 340 and the housing (not shown) of the vehicle mini lamp to prevent corrosion of cable wires 162, 164 within cables 320, 321, and 322. In this embodiment of splitter assembly 300, any corrosion that will occur will be at two-position connector 315, rather than within the vehicle mini lamp or splitter assembly 300. In the event that corrosion occurs at two-position connector 315, connector cable 310 and two-position connector 315 can be replaced, rather than having to replace cables 320, 321, or 322 as well as the corresponding vehicle mini lamp. In the alternative, two-position connector 315 alone can be severed from connector cable 310 and another two-position connector be spliced to connector cable 310. Although FIG. 9 shows the rightmost cable as being connector cable 310 and the remaining three being cables 320, 321, and 322, it should be understood that this is not intended to be limiting and that any of the cables can function as the connector cable with the remaining three being connected to a corresponding vehicle mini lamp.

Although, for convenience, the vehicle mini lamp has been described primarily with reference to several specific embodiments, it will be apparent to those of ordinary skill in the art that the lamp and the components thereof can be modified without departing from the spirit and scope of the following claims.

We claim:

1. A vehicle lamp comprising:
   a lamp housing having a top end, body with an interior portion and a lens portion covering said top end,
   said housing disposed within an opening in a surface such that said lens portion is substantially flush with the surface and said body is positioned behind said surface;
   circuitry disposed within said interior portion of the housing;
   at least one light source being electrically connected to said circuitry; and
   an attachment member being separate from and disposed substantially around said housing between said housing and said surface, such that said vehicle lamp seals the opening within the surface.

2. The vehicle lamp of claim 1, wherein said surface is a wall of a vehicle body.

3. The vehicle lamp of claim 1, wherein said surface is a portion of a mounting structure which fits within a wall of a vehicle body.

4. The vehicle lamp of claim 3, wherein said vehicle lamp is one of a plurality of vehicle lamps mounted to said mounting structure and interconnected to one light source via a splitter assembly, said splitter assembly comprised of a connector wire connected to a power source, such that each of said plurality of vehicle lamps operates parallel to one another.

5. The vehicle lamp of claim 1, wherein said lens is selected from a group consisting of: a red lens, emitting a generally red light from said vehicle lamp, a yellow-amber lens, emitting a generally yellow-amber light from said vehicle lamp, or a clear lens and said at least one light source emits red light, emitting red light from said vehicle lamp, or said at least one light source emits yellow-amber light, emitting yellow-amber light from said vehicle lamp.

6. The vehicle lamp of claim 1 further comprising a circuit board having said circuitry mounted thereon.

7. The vehicle lamp of claim 6, wherein said light source is mounted to a first side of said circuit board and a resistor is mounted to said circuit board at a second side of said circuit board.

8. The vehicle lamp of claim 7, wherein said resistor regulates current within said vehicle lamp.

9. The vehicle lamp of claim 8, wherein said circuit board is further comprised of a plurality of throughholes, each of said plurality of throughholes being plated with an electrically conductive material to allow electrical continuity between said first side and said second side, wherein said electrically conductive material is a solder.

10. The vehicle lamp of claim 6, wherein said housing includes an inner surface being tapered or including a ledge, said tapered inner surface or said ledge of said housing being adapted to receive and support said circuit board.

11. The vehicle lamp of claim 1, wherein said housing is made of a material selected from a group consisting of polycarbonate plastic and acrylic, and wherein said lens is made of a material selected from a group consisting of polycarbonate plastic, acrylic, and glass.

12. The vehicle lamp of claim 1, wherein said vehicle lamp is further comprised of a potting compound for filling at least a portion of said housing.

13. The vehicle lamp of claim 12, wherein said potting compound encapsulates said circuitry and at least partially encapsulates said at least one light source.

14. The vehicle lamp of claim 12, wherein said potting compound provides a heat sink to said vehicle lamp.

15. The vehicle lamp of claim 1, wherein said attachment member has an upper surface which creates a flush meeting with said lens, and wherein said upper surface of said attachment member is arcuate and said lens is generally arcuate.

16. The vehicle lamp of claim 15, wherein said lens includes a lip and said attachment member includes a recess adapted to receive said lip of said lens and create said flush meeting therebetween.

17. The vehicle lamp of claim 1, wherein said vehicle lamp is adapted for use as a clearance lamp, a side marker lamp, or an identification lamp.

18. The vehicle lamp of claim 1, wherein said light source comprises at least one light emitting diode.

19. A vehicle lamp comprising:
   a lamp housing having a top end, body with an interior portion and a lens portion covering said top end,
   said housing disposed within an opening in a surface such that said lens portion is substantially flush with the surface and said body is positioned behind said surface;
   circuitry disposed within said interior portion of the housing, said circuitry being disposed on a common axis;
   at least one light source being electrically connected to said circuitry;
   a resistor electrically connected to the circuitry, said resistor having a center that is aligned on the same common axis as the circuitry; and
   an attachment member being separate from and disposed substantially around said housing between said housing and said surface, such that said vehicle lamp seals the opening within the surface.

* * * * *